(12) United States Patent
Corcoran

(10) Patent No.: US 8,393,518 B2
(45) Date of Patent: Mar. 12, 2013

(54) MOBILE MANUFACTURING PLATFORM

(75) Inventor: Thomas P. Corcoran, Branson West, MO (US)

(73) Assignee: Thomas P. Corcoran, Bransow West, MD (US)

( * ) Notice: Subject to any disclaimer, the term of this patent is extended or adjusted under 35 U.S.C. 154(b) by 70 days.

(21) Appl. No.: 13/129,901

(22) PCT Filed: Aug. 26, 2009

(86) PCT No.: PCT/US2009/055013
§ 371 (c)(1),
(2), (4) Date: Aug. 5, 2011

(87) PCT Pub. No.: WO2010/059278
PCT Pub. Date: May 27, 2010

(65) Prior Publication Data
US 2012/0018495 A1  Jan. 26, 2012

Related U.S. Application Data

(63) Continuation of application No. 12/313,060, filed on Nov. 18, 2008, now abandoned.

(51) Int. Cl.
*B23K 37/00* (2006.01)
*A47J 36/02* (2006.01)
*B60P 3/00* (2006.01)
*B60P 3/14* (2006.01)

(52) U.S. Cl. .... 228/47.1; 228/101; 296/24.3; 296/24.32

(58) Field of Classification Search ................ 228/44.7; 296/24.3, 24.32
See application file for complete search history.

(56) References Cited

U.S. PATENT DOCUMENTS

| | | | | |
|---|---|---|---|---|
| D132,712 S * | 6/1942 | Troche | ............. | D12/98 |
| D166,530 S * | 4/1952 | Couse | ............. | D12/99 |
| 2,811,111 A * | 10/1957 | Levitz et al. | ............. | 104/126 |
| 4,272,664 A * | 6/1981 | Theurer | ............. | 219/53 |
| 4,431,902 A * | 2/1984 | Wallen | ............. | 219/125.12 |
| 4,516,308 A * | 5/1985 | Urban | ............. | 29/564 |
| 4,633,055 A * | 12/1986 | Conley | ............. | 219/121.39 |
| 4,686,877 A * | 8/1987 | Jaritz et al. | ............. | 83/177 |
| 5,493,817 A * | 2/1996 | Speer | ............. | 52/69 |
| 5,983,696 A | 11/1999 | Maher | | |
| 6,132,509 A * | 10/2000 | Kuschnereit | ............. | 118/64 |
| 6,787,726 B2 * | 9/2004 | Thelen et al. | ............. | 219/54 |
| 6,842,665 B2 | 1/2005 | Karlen | | |
| 7,114,754 B2 * | 10/2006 | Morello | ............. | 296/24.32 |
| 7,238,916 B2 * | 7/2007 | Samodell et al. | ............. | 219/125.1 |
| 7,895,950 B2 * | 3/2011 | Green et al. | ............. | 104/2 |
| 8,061,752 B2 * | 11/2011 | Ohnstad et al. | ............. | 296/26.15 |
| 8,122,806 B2 * | 2/2012 | Logan | ............. | 83/692 |
| 2002/0005334 A1 | 1/2002 | Matsumoto et al. | | |
| 2002/0170243 A1 | 11/2002 | Don et al. | | |
| 2005/0153075 A1 * | 7/2005 | Molnar et al. | ............. | 427/299 |
| 2005/0186062 A1 | 8/2005 | Wall | | |
| 2005/0235581 A1 | 10/2005 | Cohen et al. | | |
| 2007/0108171 A1 * | 5/2007 | Stecher et al. | ............. | 219/123 |
| 2008/0178537 A1 * | 7/2008 | Spangler et al. | ............. | 52/36.1 |

* cited by examiner

*Primary Examiner* — Kiley Stoner
*Assistant Examiner* — Carlos Gamino
(74) *Attorney, Agent, or Firm* — Bates & Bates, LLC

(57) ABSTRACT

A mobile manufacturing platform is provided. The mobile manufacturing platform has a base, a cutting platform, and a welding platform. Additionally the mobile manufacturing platform has a rail system capable of moving the stock material in X, Y, Z coordinates around the platform. Stock material can be manufactured into a final desired piece at a building site by being cut on the cutting platform and then welded on the welding platform. A finishing station for painting and other finishing may also be added. The mobile manufacturing platform can be moved from building site to building site or wherever on-site manufacturing is preferred.

18 Claims, 11 Drawing Sheets

MOBILE MANUFACTURING PLATFORM

CROSS-REFERENCE TO RELATED APPLICATIONS

This application claims priority to PCT Application No. PCT/US2009/055013 filed Aug. 26, 2009, and is a continuation and claims priority from U.S. patent application Ser. No. 12/313,060, filed Nov. 18, 2008, entitled On-Site Manufacturing; both of which are herein incorporated by reference in their entirety.

TECHNICAL FIELD

The present disclosure relates to the on-site production of steel building components for the production of warehouses, factories, and the like. More particularly, the embodiments of the present disclosure encompass a mobile manufacturing platform comprising a base, a cutting platform, a welding platform, and a rail assembly plus hoist to lift stock material into position to be manipulated. A method of using the mobile manufacturing platform is also contemplated.

BACKGROUND

Although steel buildings have long been established as a viable construction method for warehouses, factories, and the like, the need for the framework of these buildings to be pre-cut and then transported to a building site adds significant non-value added costs for transportation, packaging, loading, unloading, and repeated handling of the material. Furthermore, pre-cutting may increase the lead-time to manufacture if a factory must produce and ship components needed for design alterations.

To date, there has been no attempt to fully manufacture steel building components on-site.

SUMMARY

In one aspect, the present disclosure is directed toward a mobile manufacturing platform. The mobile manufacturing platform includes a base, a cutting platform, and a welding platform. On the cutting platform and welding platform are arms with attached devices capable of cutting and welding, stock material, respectively. The mobile manufacturing platform also includes a rail system capable of moving the stock material to the cutting platform and then moving the cut pieces to the welding platform. The rail system can additionally move the welded pieces to a finishing station. Movement of the component pieces is accomplished through a hoist that has a lifting device.

Consistent with a further aspect of the disclosure, a method is provided for using the mobile manufacturing platform. The method includes taking stock material and cutting and welding it into a desired piece at the building site. The steps of the method can be controlled automatically, such as through the use of computer numerical control or ("CNC") software.

DETAILED DESCRIPTION

Before describing the exemplary embodiments in detail, it is to be understood that the embodiments are not limited to particular machines or methods, as the machines and methods can, of course, vary. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which an embodiment pertains. Many methods and materials similar, modified, or equivalent to those described herein can be used in the practice of the current embodiments without undue experimentation.

As used in this specification and the appended claims, the singular forms "a", "an" and "the" can include plural referents unless the content clearly indicates otherwise. Thus, for example, reference to "a component" can include a combination of two or more components.

Figure 1:
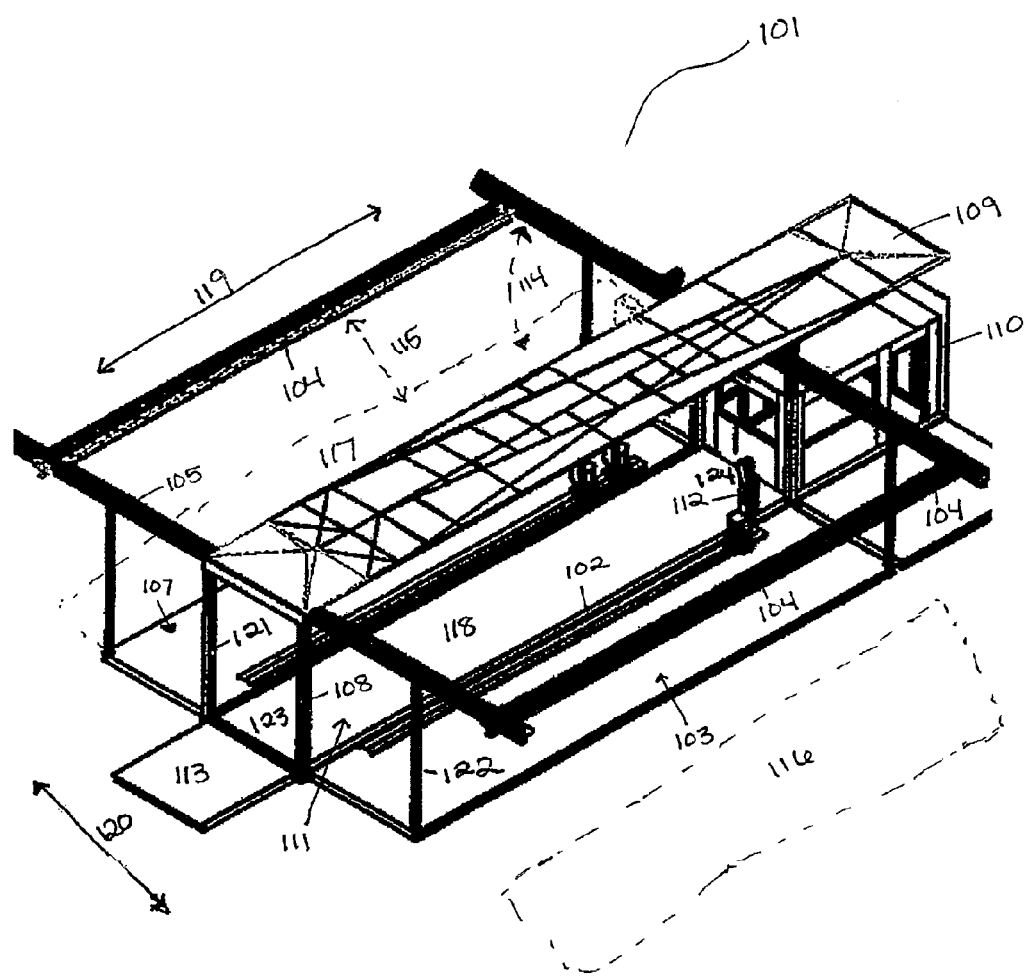
FIG. 1 is a schematic of a mobile manufacturing platform in operating position with the roof raised and the perpendicular rails perpendicular to the longitudinal length of the base.
Figure 2:
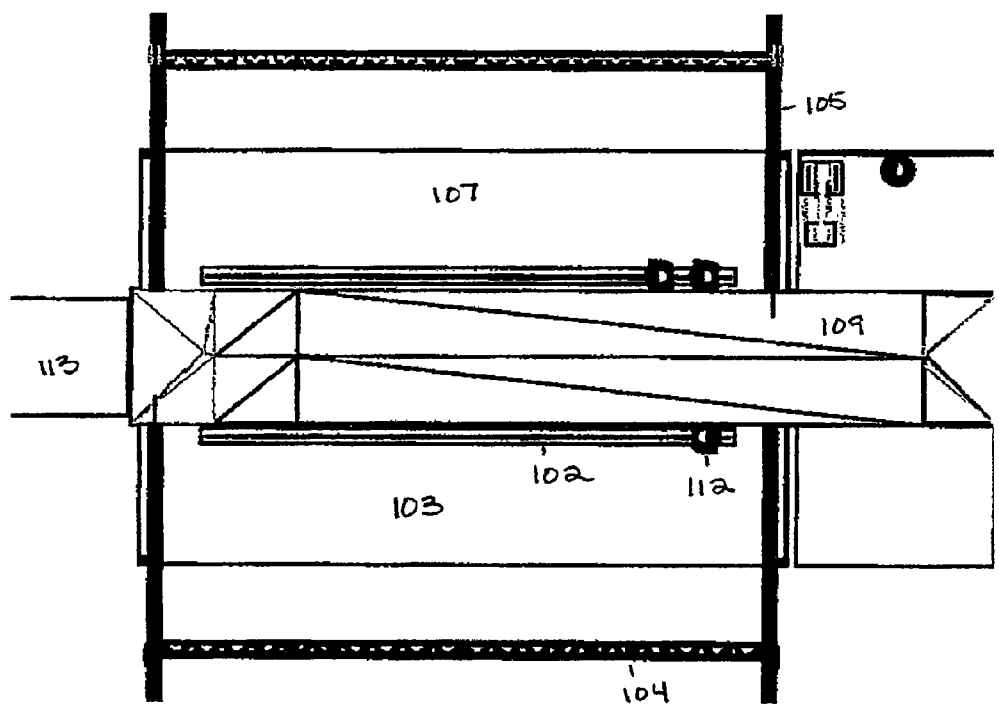
FIG. 2 illustrates the top of the mobile manufacturing platform with the perpendicular rail, base, and cutting and welding platform in operating position.

Exemplary embodiments of the mobile manufacturing platform will now be explained with reference to the figures. This description is provided in order to assist in the understanding of the invention and is not intended to limit the scope of the invention to the embodiments shown in the figures or described below. Embodiments of the mobile manufacturing platform will first be described in the open or operating position. FIG. 1 demonstrates the mobile manufacturing platform in a fully raised and open position. Referring now to FIG. 1 and FIG. 2, in one aspect, the mobile manufacturing platform 101 comprises a base 111, a cutting platform 103, a welding platform 107, an arm railing 102, an arm 112, a distal end 113, a control room 110, parallel rails 104, a perpendicular rail 105, a roof 109, and numerous vertical columns 108. Stock material 156 is set in the loading area 116. A finishing station may be placed in the finishing area 117.

In certain embodiments, the base 111 of the mobile manufacturing platform 101 will be about 8 feet in width. In one embodiment, the base 111 will be about 8 feet 6 inches in width. In other aspects, the width of the base 111 is no greater than about 6 feet. The skilled artisan understands that the width of the base may be varied depending on how the mobile manufacturing platform will be moved. The top deck 118 of the base 111 may be protected from wear and tear of use. For example, the top deck 118 may be covered with steel. The steel may be generally any thickness that provides protection to the base 111. In certain embodiments, the steel covering the top deck 118 will be ⅛ inch thick. Other exemplary embodiments cover the top deck 118 with 24 to 26 gauge galvanized steel. Stainless steel and aluminum are also contemplated in particular embodiments. Protective material may be permanently attached to the top deck 118. In one embodiment, steel will be welded to the top deck 118. In other embodiments, the protective material will be removable from the top deck.

The cutting platform 103 and welding platform 107 are disposed on either side of the longitudinal length of the base 119. Embodiments where the cutting platform 103 is on the right longitudinal length of the base and the welding platform 107 is on the left longitudinal length of the base, and vice-versa are anticipated. The cutting platform 103 and welding platforms 107 are connected with the base 111 such that they can be folded up from the base to a position substantially perpendicular to the base 111. At least one arm 112 will be connected with the cutting platform 103 and at least one arm 112 will be connected with the welding platform 107. Both the cutting platform 103 and welding platform 107 may include a fixed backstop. The fixed backstop provides a uniform position for each piece of stock material or cut material placed on either of the platforms.

In many cases, the arm 112 will be robotic. Robotic arms with various attachments for use in automated manufacturing are well known in the art and not meant to be limiting. Any arm able to manipulate the stock material 156 into the final desired piece may be used with the mobile manufacturing platform 101. An arm 112 may have a cutting attachment 154. In one embodiment, the arm 112 on the cutting platform 103 will be a plasma arc cutting machine, such as those commonly found in the art. In most embodiments, an arm 112 on the welding platform 107 will have a welding attachment 155 such as those commonly used to weld materials. An arm 112 may travel along an arm railing 102. In one aspect, such as the embodiment shown in FIG. 1, the arm railing 102 will be along the longitudinal length of the cutting platform 103 and/or welding platform 107 and adjacent to the connection between the cutting platform 103 and/or welding platform 107 and the base. In other embodiments, the arm railing may be at different positions on the cutting platform, welding platform, and/or base. It is to be understood that as long as a piece of stock material 156 can be appropriately manufactured, the position and size of the arm railing is not meant to be limiting. In certain embodiments, the welding platform 107 will have two arms. One arm will be capable of welding through the use of a metal inert gas welder ("MIG"), wire feed welding attachment. The other arm in this embodiment will place small components in a position such that the first arm can weld them. Both of these arms may share a common arm railing.

The welding platform 107 may also include a matrix of holes which allow insertion of different sized pegs. These pegs (not shown) may be removably mounted into the matrix of holes manually. The pegs are capable of supporting the cut pieces at the proper height for welding.

A distal end 113 is attached with the transverse length of the base 120. In many embodiments, the distal end 113 is also connected with the base such that it can be folded up from the base 111 to a position substantially perpendicular to the base 111. The connection may be through a hinge or other similar mechanism as is commonly known and used in the art. The width of the distal end 113 is substantially the same as the width of the base 111 in most embodiments.

Figure 5:
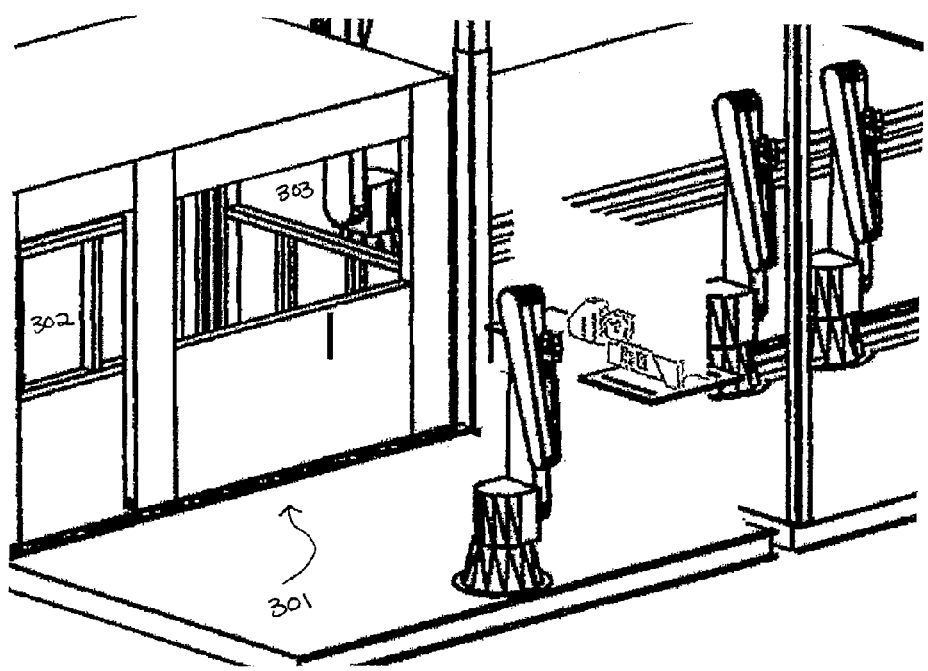
FIG. 5 illustrates a control room attached with the mobile manufacturing platform.

A control area 110 may be added to the platform. In one embodiment, the control area 110 will be a control room 301 attached with the base 111 such as the embodiment illustrated in FIG. 5. In other specific embodiments, the control area 110 is a control room 301 separated from the base 111. In these embodiments, the control room is positioned along the longitudinal side of either the welding platform 102 or the cutting platform 103. A control room 301 may include one or more openings in individual embodiments. The openings may be doors 302, which allow for entry and exit into the control room 301. Generally, a control room 301 will also include windows 303, which allow for supervision of the base 111, cutting platform 103, and welding platform 107. In many cases, an operating system will be housed in the control area 110. An example operating system includes a computer with mobile manufacturing platform operating software. In many embodiments, this software is capable of controlling movement of the hoist 132, parallel rail 104, and arm 112. Software may additionally control movement of a perpendicular rail 105 into the operating position. Software with these capabilities is well-known in the art. For example, software may be commercially available computer numerical control software.

A perpendicular rail 105, such as the one shown in FIG. 1, may be any appropriate shape, length, and width. The only limitation on the shape of a perpendicular rail 105 is that it is compatible with a parallel rail 104 such that the parallel rail 104 is capable of moving substantially parallel along the perpendicular rail 105. As one skilled in the art understands, the final length of the perpendicular rail 105 when in the operating position does not need to be the same as the length of the perpendicular rail 105 in the storage position. In one embodiment, the length of a perpendicular rail 105 in the operating position will be 17 feet, 6 inches. In certain embodiments, a perpendicular rail 105 is folded in a storage position while the mobile manufacturing platform is stored or transported and then extended out from the storage position into the operating position. In one embodiment, the perpendicular rail 105 is called a swing rail. In a swing system embodiment, if a roof is present, the perpendicular rails 105 extend into the operating position after the roof is raised fully. In other embodiments, each perpendicular rail 105 is disassembled into pieces for storage. The perpendicular rails 105 will generally be perpendicular to the longitudinal length of the base 119 when they are in the operating position. The perpendicular rails 105 are locked into position during operation in many embodiments. The perpendicular rails may be locked into position through connection to a support post 122.

In exemplary embodiments, the mobile manufacturing platform will have two perpendicular rails 105. In other embodiments, the mobile manufacturing platform 101 will have four perpendicular rails 105. The number of perpendicular rails is not limiting, including not being limited to either an even or odd number, as long as the perpendicular rail is compatible with a parallel rail 104 and the parallel rail 104 is capable of moving along the length of the perpendicular rail 105. In different embodiments, the parallel rail 104 may move along the entire length of the perpendicular rail 105 or only along a portion of the perpendicular rail 105.

In some embodiments, support posts 122 are permanently connected with the cutting platform 103 and/or welding platform 107 by hinges or other similar mechanisms. In these embodiments, the support posts move to a position substantially perpendicular to the transverse edge of the base 111 during operation. In some embodiments, during operation support posts 122 are connected with a perpendicular rail 105. Support posts 122 act as stabilizers for the perpendicular rail 105 when the perpendicular rail 105 is in the operating position. The number of support posts 122 is not limiting. In certain embodiments, one support post 122 is connected with each perpendicular rail 105. In other embodiments, more than one support post 122 is connected with each perpendicular rail 105. In one embodiment, support posts 122 are connected with a perpendicular rail 105 and the cutting platform 103 and/or welding platform 107 at the construction site. In other embodiments, the support posts 122 are connected with the cutting platform 103 and/or welding platform 107 even during storage and mobility. In this embodiment, the support posts 122 are raised from their storage position parallel to the base into the operating position with pneumatic cylinders. The connection between the support posts 122 and the cutting platform 103 and/or welding platform 107 may include a backstop in individual embodiments. The backstop ensures that the support posts reach the correct operating position to provide adequate stabilization. In exemplary embodiments, the support posts 112 are locked into position during operation. The support posts 112 may be locked through the use of a cup positioned on the perpendicular rail. The cup fits over the end of the support post 122 and locks it into place. The perpendicular rails 105 will generally be perpendicular to the longitudinal length of the base 119 when they are in the operating position.

Figure 6:
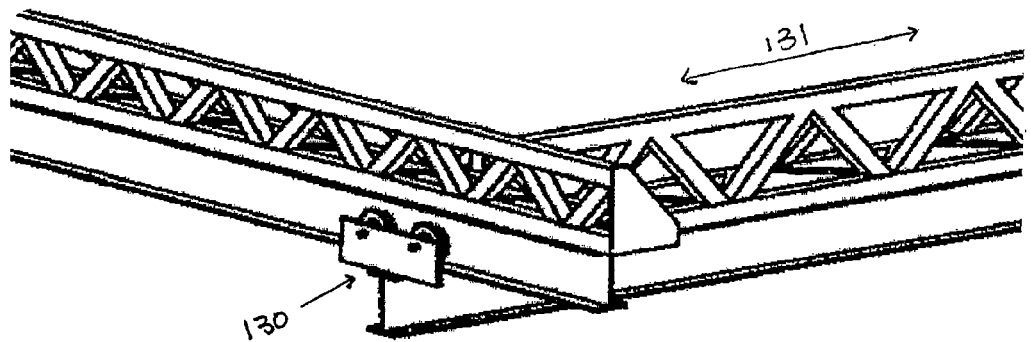
FIG. 6 is a schematic of the perpendicular and parallel rail assembly.
Figure 7:
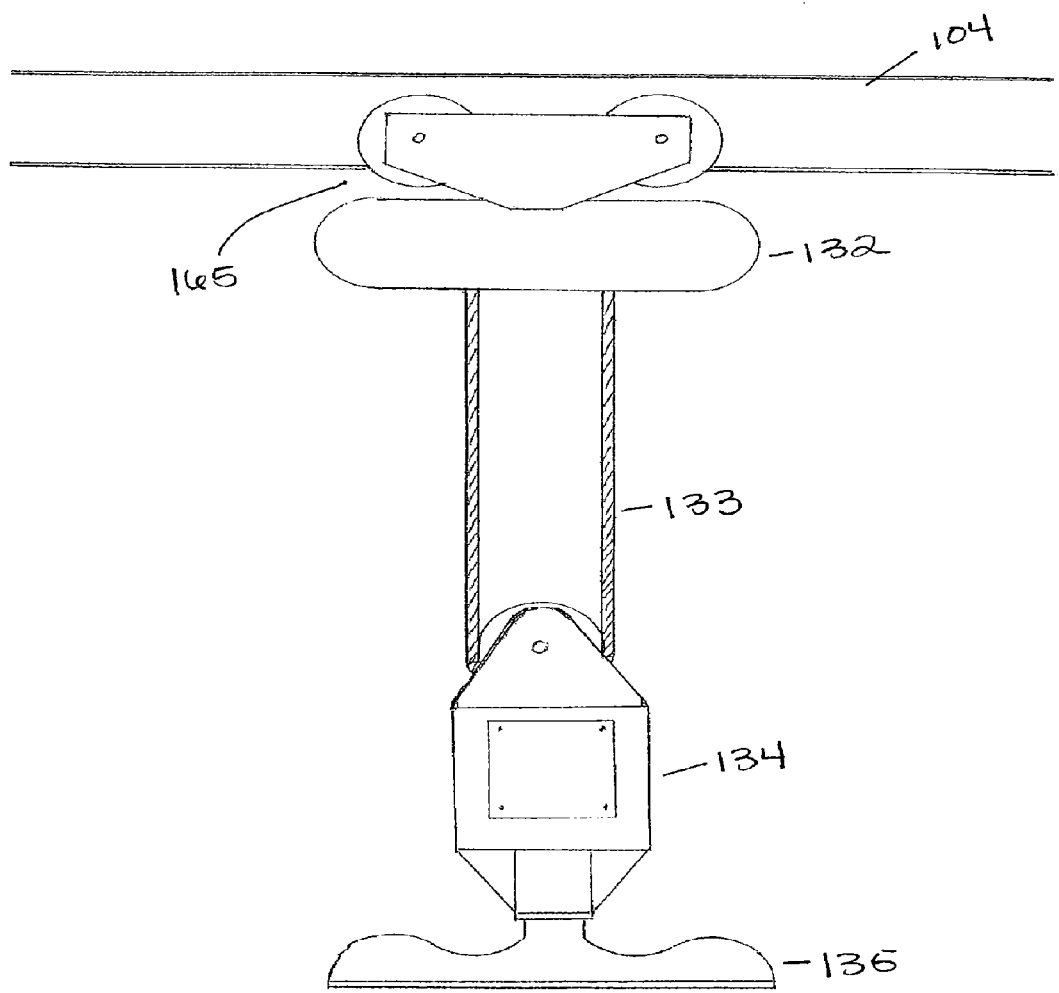
FIG. 7 is a view of the hoist.

At least one parallel rail 104 is attached with a perpendicular rail 105 such that the parallel rail 104 is capable of moving along an axis of the longitudinal length of the base 115. In many embodiments, the parallel rail 104 is connected between more than one perpendicular rail 105. In other embodiments, a parallel rail 104 is connected with a single perpendicular rail 105. As illustrated in FIG. 6, in some embodiments, a parallel rail 104 is attached with a perpendicular rail 105 through a dolly system 130. Dolly systems 130, such as the one demonstrated in FIGS. 6 and 7 are well known in the art and not meant to be limiting. Any dolly system 130 allowing the parallel rail 104 to move along the perpendicular rail 105 may be used. Control of the dolly system is accomplished through electrical lines and operating wires running from a motor to a channel parallel to the rail system. The electrical lines and operating wires may be secured in u-shaped channels, such as link type conduit, in certain embodiments.

In many embodiments, the rail system is attached directly to base 111 through the perpendicular rails 105. However, in some embodiments, the rail system may be a stand-alone system, such as those commonly used in the art. An example of a stand-alone rail system is a gantry crane or the like.

Motors capable of controlling movement of a dolly system such as the one illustrated by the dolly system 130 are well known. In specific embodiments, the motor will be a stepper motor linked to the operating system. The motor drives a standard gear drive system. These types of motors may also be used to control a hoist dolly system 162, which in turn controls movement of the hoist along a parallel rail. An example of another type of motor that may be used with individual embodiments includes a servo motor.

Using a hoist 132, such as the one demonstrated in FIG. 7, stock material positioned in the loading area is lifted and then set into predetermined coordinates on the cutting platform 104 through hoist 132 and parallel rail 104 movement. In the embodiment demonstrated in FIG. 7, the hoist 132 is connected with a pulley 133, a motor 134, and lifting device 135. The hoist may be a double pulley electric hoist. Movement is possible in X, Y, Z coordinates. Control of movement along X, Y, and Z coordinates is through control of the dolly system 130 and hoist 132 by the operating system. The hoist 132 used with the hoist dolly system 162 may be a standard electric hoist such as those commonly encountered by the skilled artisan. Once on the cutting platform 104, the stock material 156 is fixed into the appropriate position for cutting. Pneumatic clamps 157, such as those demonstrated in FIG. 4, may be used to secure the stock material on the cutting platform.

At least one hoist 132 will be attached with each parallel rail 104. The hoist 132 is capable of moving along the longitudinal length of the parallel rail 131. The hoist 132 is also capable of picking up stock material and moving the stock material within and next to the mobile manufacturing platform 101. The lifting device 135 in FIG. 7 may be a magnet. The magnet may include an electric motor, which allows the magnet to rotate approximately 360 degrees. Nevertheless, the hoist 132 may also be connected with any other lifting device 135 capable of lifting stock material 156 into position. In certain embodiments, the lifting device 135 is rotation controlled such that the stock material 156 may be rotated 360 degrees.

A roof 109 is also contemplated. In certain embodiments, the roof 109 will be the same overall width as the base 111. The roof 109 may be the same length as the base 111. The roof 109 may also be the length of the base 111 plus the control area 301. The roof 109 may be connected with the base by vertical columns 108. In many embodiments, these vertical columns 108 will be adjustable. In embodiments where the vertical columns 108 are adjustable, the roof 109 may be raised so that the other components of the mobile manufacturing platform can be placed into the open position (from the closed position) or the closed position (from the open position). The roof 109 may be lowered to a position on the support posts 122 by lowering the vertical columns 108 into a predetermined position. This predetermined position may be determined through the use of a stop mechanism, such as a pin, on the vertical column 108. In some embodiments, the vertical columns 108 will be permanently connected with the roof 109 and the base 111. Welding may be used to permanently connect the vertical columns 108 to either or both the roof 109 and base 111. Any number of vertical columns 108, or vertical columns 108 attached in any configuration, capable of stabling connecting the roof 109 to the base 111 may be used. In certain embodiments, such as the one shown in FIGS. 1 and 2, there will be at least four vertical columns 108. As further demonstrated in FIGS. 1 and 2, two vertical columns 108 will be positioned at the distal end of the base 123 and two vertical columns 108 will be positioned at the proximal end of the base 125. In some embodiments, the vertical columns 108 are capable of raising and lowering the roof 109 to an appropriate position. If the vertical columns 108 are adjustable, the adjustability may be controlled through the use of hydraulics or pneumatics. Although not preferred, adjustability may also be accomplished mechanically.

In exemplary embodiments, when being put into the closed or storage position, the perpendicular rails 105 are moved along arc 114. In this embodiment, the perpendicular rails 105 are moved under roof 109 in a position parallel to the longitudinal length of the base 119. In these embodiments, the perpendicular rails 105 are attached with the vertical columns 121 by one or more hinges. In other embodiments, the perpendicular rails 105 are separated from the vertical column during storage or mobility. After the perpendicular 105 rails are in the closed or storage position, the welding platform 107, cutting platform 103, and distal end 113 are then moved into the closed or storage position perpendicular to the base 111. The roof 109 may include a lip (not shown) such that when the mobile manufacturing platform is in the storage or closed position, the lip of the roof 109 locks the cutting platform 103, welding platform 107, and distal end 113 into the storage position. The cutting platform 103, welding platform 107, and distal end 113 are released from the locked storage position by raising the roof 109 such that the lip of the roof is no longer over the edge of the cutting platform 103, welding platform 107, and distal end 113.

Figure 3:
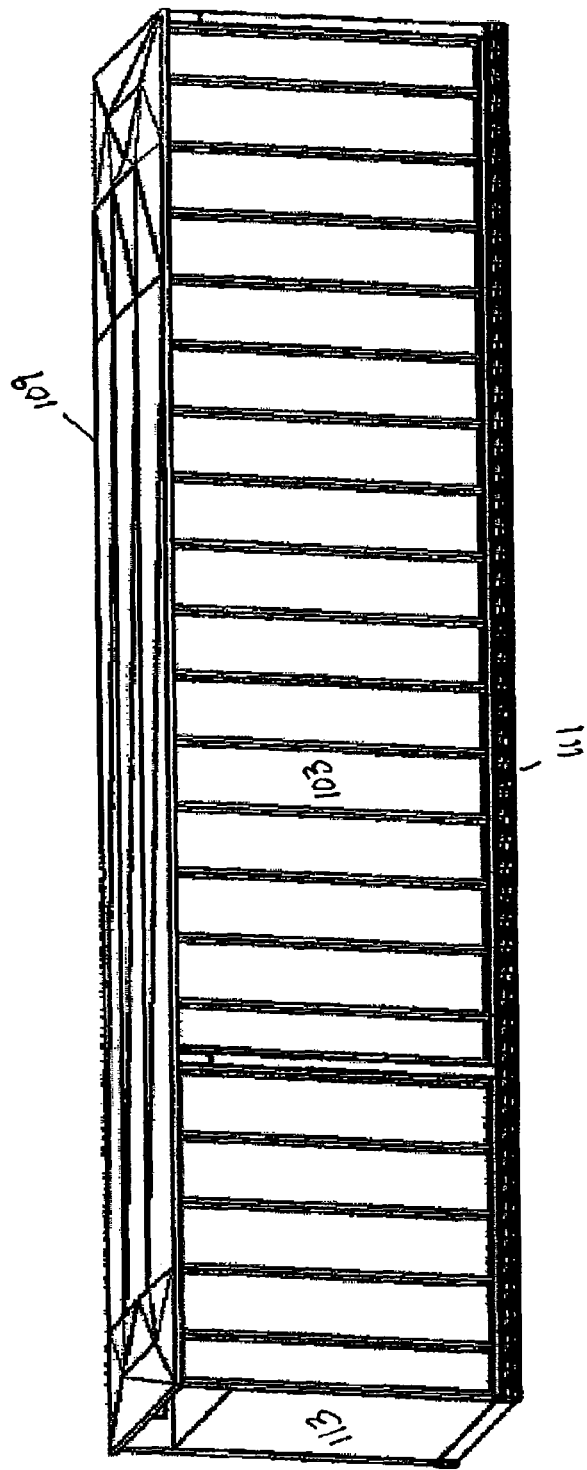
FIG. 3 shows the mobile manufacturing platform in the closed or storage position.

Generally, the mobile manufacturing platform 101 will be transported only while in the closed or storage position. However, it is to be understood that the mobile manufacturing platform 101 may be transported while in the open or operating position. FIG. 3 demonstrates the embodiment of FIG. 1 and FIG. 2 in the closed or storage position.

Figure 4:
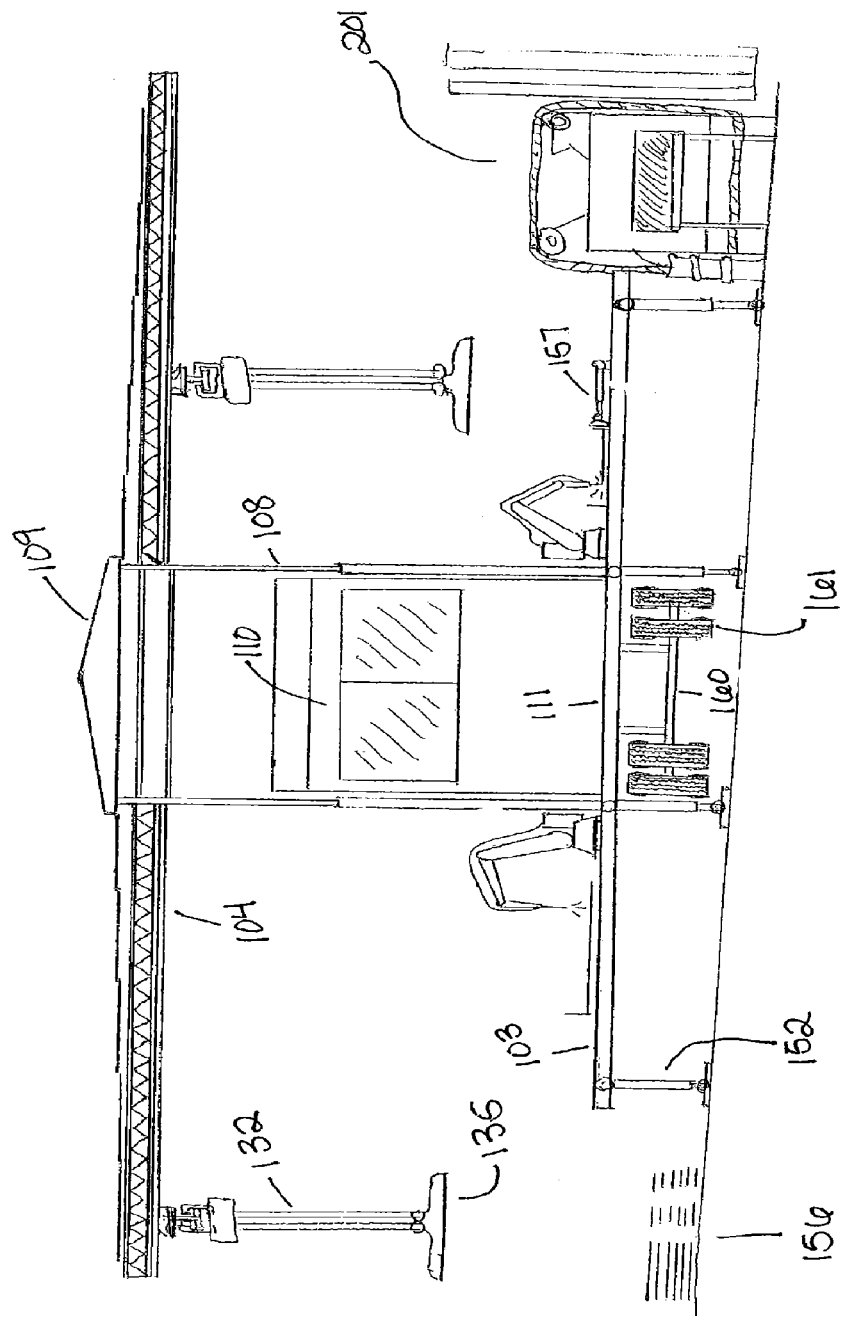
FIG. 4 demonstrates a view of the underside of one aspect of the mobile manufacturing platform base.

In one embodiment, the base 111 of the mobile manufacturing platform 101 will be connected with axles 160 or wheels 161, such as those shown in FIG. 4. For example, in one embodiment, such as that shown in FIG. 4, the base 111 may be attached with a standard set of semi-trailer axles 150, as is commonly known in the industry. The standard semi-trailer axles 150 may be positioned toward the back one-third of the base 111. The standard semi-trailer axles 150 may be attached with double wheels 151. In many cases, the wheels will be attached below the base 111 of the mobile manufacturing platform 101. If wheels are connected with the base 111, the mobile manufacturing platform 101 will include a hitch which allows the mobile manufacturing platform 101 to be connected with a vehicle. Hitches are well-known in the art and the type of hitch is not meant to be limiting. Any hitch that provides for a connection that allows the mobile manufacturing platform 101 to be moved by a vehicle is contemplated. Legs 152 may also be attached with the underside of the base 111, cutting platform 103, and welding platform 107 in specific embodiments.

In other embodiments, the base 111 is connected with a trailer capable of mobility. The type of trailer is not limiting as long as the mobile manufacturing platform 101 may be transported to a construction site. Connection to a trailer may be either permanent or transitory. The method of connection comprises connection through any appropriate means, including, but not limited to welding and fastener connections.

The connection of the cutting platform 103 and the welding platform 107 to the base 111 in some embodiments will be through a hinge. In certain embodiments, the hinge will be hydraulically controlled. The hinge is capable of moving the cutting platform 103 and the welding platform 107 into operating position from the closed or storage position. The hinge is also capable of moving the cutting platform 103 and the welding platform 107 into the closed or storage position from the operating position. In some embodiments, there will be at least five hinges connecting the cutting platform 103 to the base 111. In the same embodiment, there may be at least five hinges connecting the welding platform 107 to the base. It is to be understood that there is no requirement that the number of connections to the base 111 must be the same for the welding platform 107 and the cutting platform 103 in any individual embodiment.

During operation, the legs 152 may be extendable so as to level the base 111, cutting platform 103, and welding platform 107 in the situation of unlevel ground. The legs 152 may be hydraulically controlled in many embodiments. Hydraulic control of the legs 152 may be operated via electronic leveling sensors. In one aspect, there are three evenly spaced legs 152 on the outer edge of each the cutting platform 103 and the welding platform 107. There may also be four legs 152 on each of the corners of the underside of the base 111.

Figure 9:
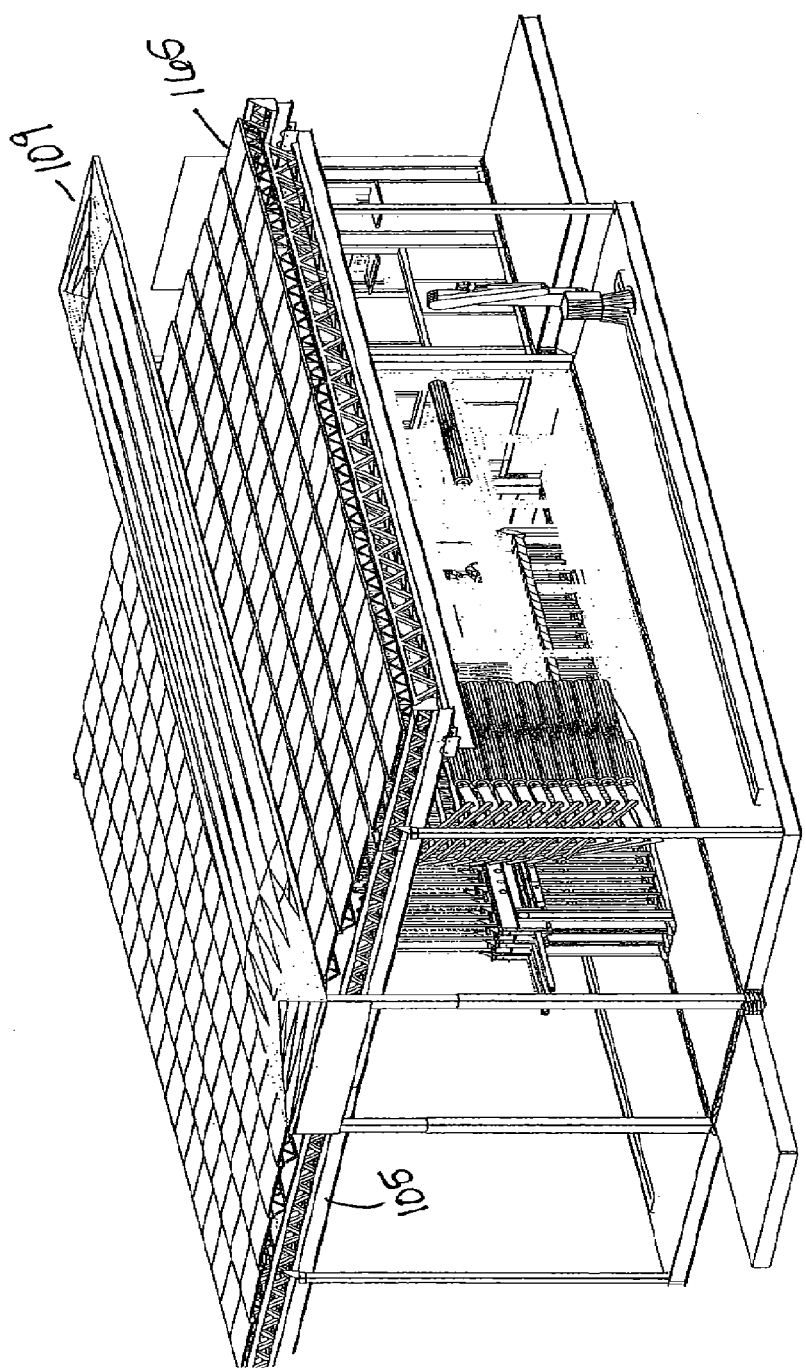
FIG. 9 shows solar panels attached with the roof and also storage of the finishing station inside the mobile manufacturing platform.
Figure 10:
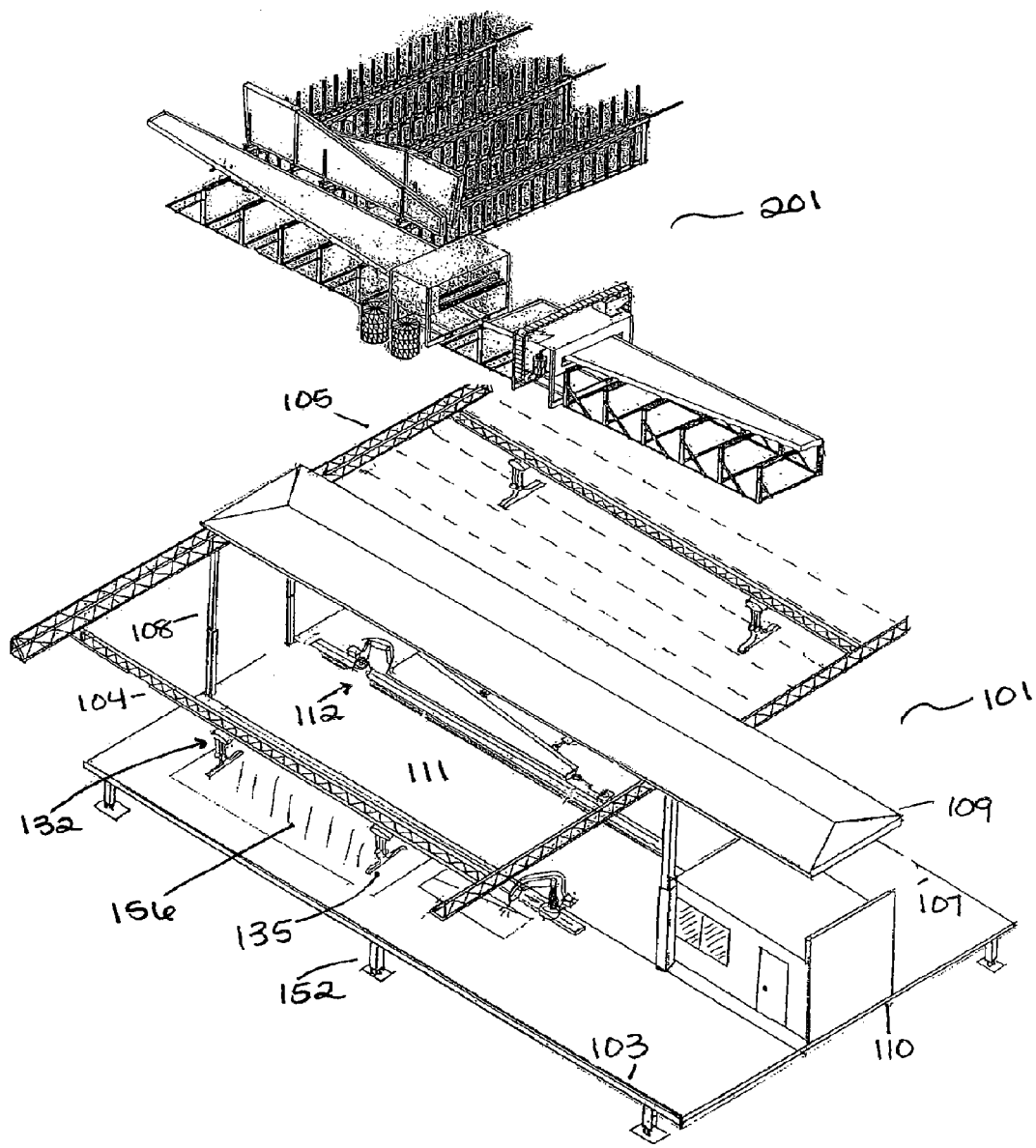
FIG. 10 demonstrates the mobile manufacturing platform in operation.

In numerous embodiments, the mobile manufacturing platform 101 includes a built in power source. In an illustrative embodiment, this power source is in the form of solar cells capable of charging an energy storing device to the charging level required to power the components of the mobile manufacturing platform. In one embodiment, such as the one demonstrated in FIG. 9, solar cells 165 are attached with the roof platforms 167. In one example, these roof platforms 167 are attached with a perpendicular rail 105. Roof platforms 167 may be attached with a perpendicular rail 105 through roller mounts or other attachments which allow the roof platforms to be moved into operating position. In certain embodiments, the roof platforms have a stop (not shown) at each side. The roof platforms 167 may be pulled into the operating position along the perpendicular rail 105 in a single unit. Generally, along the perpendicular rail 105, each roof platform is a couple of inches below the roof platform 167 adjacent in the direction of the roof. In a particular embodiment, the roof platforms 167 are 3' in width and 40' in length when in the operating position. The roof platforms 167 may be put into the storage position by pushing along the roller mount on the perpendicular rail 105 toward the roof 109 such that each individual roof platform 167 folds under the one adjacent to it. In the closed or storage position, the roof platforms 167 are stored under the roof. In addition to solar panels, internal power sources can also include generators. Furthermore, in some embodiments, the mobile manufacturing platform 101 is controlled through the use of on-site electrical power.

In several embodiments, a finishing station 201 may optionally be added on a longitudinal side of the welding platform 107 or cutting platform 103. In many cases, if a finishing station 201 is added, it will be added on the longitudinal side of the welding platform 107. Finishing stations that would work with the embodiments are commercially available and well-known in the art. For example, the finishing station 201 may comprise a roller conveyor system that has an electric motor hooked to limit switches or which may be controlled using the computer and software disclosed.

Figure 8:
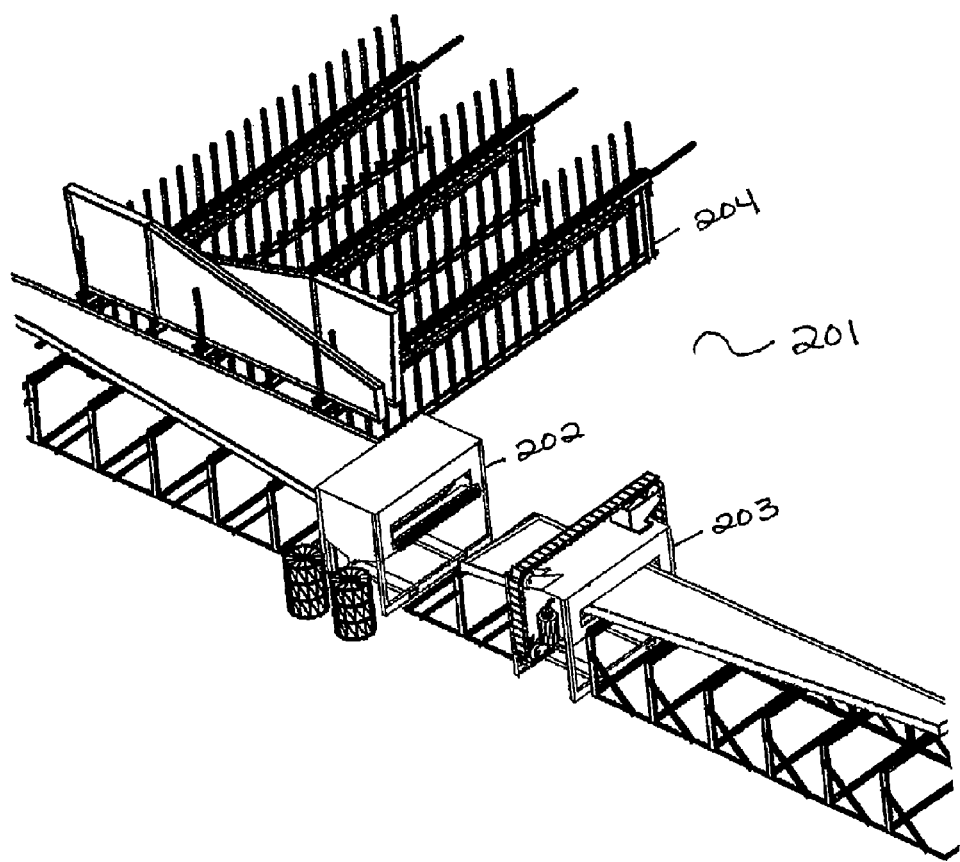
FIG. 8 is an example finishing station.

An exemplary finishing station 201, such as that depicted in FIG. 8, may be used in connection with the mobile manufacturing platform 101. Once a piece of stock material has been cut and welded to the appropriate specifications, it may be transported by a hoist to a finishing station 201. A finishing station 201 may include a bead blasting booth 203, a paint booth 202, an auto stack drying rack 204, and several extended lifting arms 206. The bead blasting booth 203 may comprise a housing that the final desired piece travels through via a roller conveyor to have a bombardment of beads forced onto the surface of the finished piece, causing all loose debris to be removed. The components of the finishing station 201, in one aspect, may be capable of treating the final desired piece on both sides.

Figure 11:
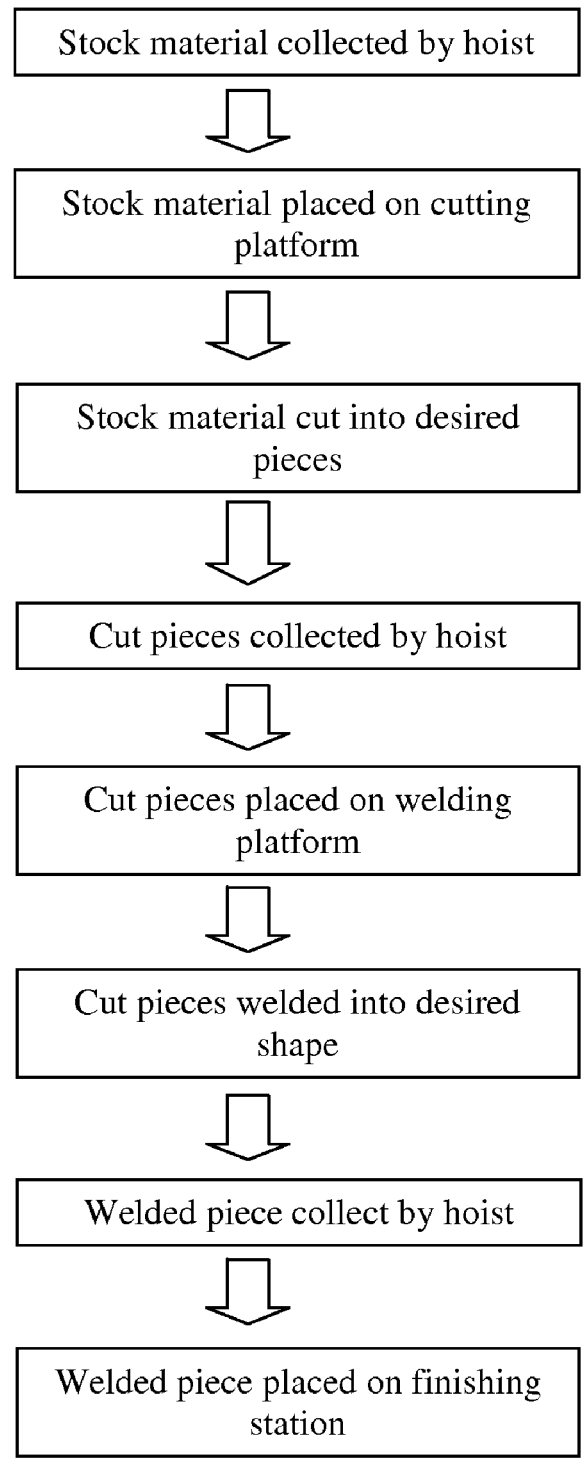
FIG. 11 is a flow diagram depicting an exemplary disclosed method of using the mobile manufacturing platform.

With reference to operation of the mobile manufacturing platform 101, partially shown in the flow diagram of FIG. 11, stock material placed in the loading area is collected by a hoist 400 and placed on the cutting platform 103 in a predetermined position 402. Stock material may be positioned in the loading area 116 using any appropriate means. In certain embodiments, stock material is steel used to build structural steel buildings. Once the stock material is on the cutting platform 103 in a predetermined position, an arm 112 on the cutting platform 103, wherein such arm has a cutting attachment 154, travels along the arm railing 102, cutting the stock material into a desired shape or length 404. Following cutting, the cut pieces of the material are moved 406 by the hoist 132 to a predetermined position on the welding platform 408. If pneumatic clamps 157 have been used to secure the stock material into place, once cut, the cut material is released from the pneumatic clamps 157 before being moved to the welding platform 107. Once the cut pieces are on the welding platform 107 in a predetermined position, an arm 112 on the welding platform 107, wherein such arm has a welding attachment, travels along the arm railing 102, welding the cut pieces into a final desired piece 410. As used herein, a "final desired piece" is the framework piece that can be used in a manufacturing process without further cutting or welding.

Once the stock material has been cut and welded into a desired shape, in certain embodiments, a hoist may collect 412 and move 414 the desired shape to a finishing station 201. If desired, at the finishing station 201, the final desired piece may be additionally processed into a desired building component, such as through bead blasting and painting.

Following manufacture of the chosen number of desired building components, the mobile manufacturing platform 101 may be closed for either storage or transportation. To close the mobile manufacturing platform 101, in one embodiment, the parallel rail 104 and hoist is first moved under the roof, the support post 122 is disconnected from the perpendicular rail 105, and then the perpendicular rail 105 is moved into its storage position. The cutting platform 103, welding platform 107, and distal end 113 are then rotated upward into a position perpendicular to the plane of the base 111. If preferred, in certain embodiments, the finishing station 201 will be stored inside the closed mobile manufacturing platform prior to folding up the distal end 113.

Any aspect or design described herein as "exemplary" is not necessarily to be construed as preferred or advantageous over other aspects or designs. Exemplary embodiments may be implemented as a method, apparatus, or article of manufacture. The word "exemplary" is used herein to mean serving as an example, instance, or illustration.

From the above discussion, one skilled in the art can ascertain the essential characteristics of the invention, and without departing from the spirit and scope thereof, can make various changes and modifications of the embodiments to adapt to various uses and conditions. Thus, various modifications of the embodiments, in addition to those shown and described herein, will be apparent to those skilled in the art from the foregoing description. Such modifications are also intended to fall within the scope of the appended claims.

What is claimed is:

1. A mobile manufacturing platform comprising:
    (a) a mobile base;
    (b) a cutting platform connected with the mobile base, wherein the cutting platform is disposed along a longitudinal side of the mobile base; and
    (c) a welding platform connected with the mobile base, wherein the welding platform is disposed along a longitudinal side of the mobile base opposite the cutting platform,
    wherein the cutting platform comprises an arm with a cutting attachment capable of cutting a stock material into a desired shape;
    wherein the welding platform comprises an arm with a welding attachment capable of welding the cut stock material in a final desired piece; and
    wherein the cutting platform and the welding platform are capable of folding into a position substantially perpendicular to the plane of the mobile base.

2. The mobile manufacturing platform of claim 1 further comprising a rail system, wherein the rail system is capable of moving the stock material from the cutting platform to the welding platform.

3. The mobile manufacturing platform of claim 2 wherein the rail system is directly connected with the mobile base.

4. The mobile manufacturing platform of claim 3 wherein the rail system comprises at least one perpendicular rail and at least one parallel rail connected with the perpendicular rail.

5. The mobile manufacturing platform of claim 4 wherein the rail system comprises two perpendicular rails and two parallel rails.

6. The mobile manufacturing platform of claim 3 wherein the parallel rail is capable of moving along the length of the perpendicular rail.

7. The mobile manufacturing platform of claim 6 wherein the parallel rail is connected with the perpendicular rail through a dolly system.

8. The mobile manufacturing platform of claim 4 further comprising a hoist connected with the parallel rail.

9. The mobile manufacturing platform of claim 8 further comprising a lifting device connected with the hoist.

10. The mobile manufacturing platform of claim 4 wherein the perpendicular rail is a swing rail.

11. The mobile manufacturing platform of claim 4 further comprising at least one support post connected with each perpendicular rail.

12. The mobile manufacturing platform of claim 1 further comprising a roof connected with the mobile base.

13. A mobile manufacturing platform comprising:
    (a) a mobile base;
    (b) a cutting platform connected with the mobile base, wherein the cutting platform is disposed along a longitudinal side of the mobile base;
    (c) a welding platform connected with the mobile base, wherein the welding platform is disposed along a longitudinal side of the mobile base opposite the cutting platform;
    (d) a roof connected with the mobile base; and
    (e) a rail system;
    wherein the cutting platform comprises an arm with a cutting device capable of cutting a stock material into a desired shape;
    wherein the welding platform comprises an arm with a welding device capable of welding the cut stock material in a final desired piece;
    wherein the rail system is capable of moving the stock material from the cutting platform to the welding platform;
    wherein the entire mobile manufacturing platform is capable of being moved from building site to building site; and
    wherein the cutting platform and the welding platform are capable of folding into a position substantially perpendicular to the plane of the mobile base.

14. A method of on-site manufacturing of steel building components comprising:
    (a) moving a stock material from a loading area to a cutting platform of a mobile manufacturing platform;
    (b) cutting the stock material on the cutting platform with an arm comprising a cutting device;
    (c) moving the cut stock material from the cutting platform to a welding platform;
    and (d) welding the cut stock material into a final desired piece with an arm comprising a welding device;
    wherein steps (a)-(d) are performed at a building site and further wherein the mobile manufacturing platform is capable of moving from building site to building site; and
    wherein the cutting platform and the welding platform are opposite each other and connected with a mobile base, further wherein the cutting platform and the welding platform are capable of folding into a position substantially perpendicular to the plane of the mobile base.

15. The method of claim 14 wherein steps (a)-(d) are controlled by an automated system.

16. The method of claim 15 wherein the automated system comprises computer numerical control software.

17. The method of claim 14 wherein the stock material can be moved along X, Y, and Z coordinates.

18. The method of claim 14 further comprising
(e) moving the final desired piece to a finishing station.

* * * * *